US008588839B2

(12) United States Patent
Blomgren et al.

(10) Patent No.: US 8,588,839 B2
(45) Date of Patent: Nov. 19, 2013

(54) POWER LOOP CONTROL METHOD AND APPARATUS

(75) Inventors: Mats Blomgren, Stockholm (SE); Linda Brus, Vällingby (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 767 days.

(21) Appl. No.: 12/639,032

(22) Filed: Dec. 16, 2009

(65) Prior Publication Data
US 2011/0143804 A1    Jun. 16, 2011

(51) Int. Cl.
H04B 7/00    (2006.01)

(52) U.S. Cl.
USPC ............................................. 455/522; 455/69

(58) Field of Classification Search
USPC ........................................................ 455/522
See application file for complete search history.

(56) References Cited

U.S. PATENT DOCUMENTS

| 7,027,828 | B2 * | 4/2006 | Kim et al. | 455/522 |
|---|---|---|---|---|
| 7,047,473 | B2 * | 5/2006 | Hwang et al. | 714/751 |
| 7,203,508 | B2 * | 4/2007 | Ohkubo et al. | 455/510 |
| 7,248,889 | B2 * | 7/2007 | Schwarz et al. | 455/522 |
| 7,315,741 | B2 * | 1/2008 | Chun | 455/436 |
| 7,430,436 | B2 * | 9/2008 | Nakao | 455/522 |
| 7,657,283 | B2 * | 2/2010 | Cai | 455/552.1 |
| 7,668,192 | B2 * | 2/2010 | Malkamaki et al. | 370/455 |
| 7,707,474 | B2 * | 4/2010 | Rinne et al. | 714/748 |
| 7,734,308 | B2 * | 6/2010 | Dominique et al. | 455/522 |
| 7,813,294 | B2 * | 10/2010 | Xiang | 370/252 |
| 7,844,881 | B2 * | 11/2010 | Iwai et al. | 714/774 |
| 7,873,070 | B2 * | 1/2011 | Hu et al. | 370/465 |
| 7,894,845 | B2 * | 2/2011 | Usuda et al. | 455/522 |
| 8,102,829 | B2 * | 1/2012 | Naito et al. | 370/338 |
| 8,125,935 | B2 * | 2/2012 | Dominique et al. | 370/311 |

(Continued)

FOREIGN PATENT DOCUMENTS

| EP | 1517456 A1 | 3/2005 |
|---|---|---|
| EP | 2088821 A1 | 8/2009 |

(Continued)

OTHER PUBLICATIONS

3rd Generation Partnership Project, 3GPP TR25.903, V8.0.0 (Dec. 2008), 3rd Generation Partnership Project; Technical Specification Group Radio Access Network; Continuous Connectivity for Packet Data Users (Release 8), Dec. 2008.

(Continued)

Primary Examiner — Hai V Nguyen
(74) Attorney, Agent, or Firm — Coats & Bennett, P.L.L.C.

(57) ABSTRACT

A method for implementing power loop control at a RBS controlled by an RNC includes receiving an SIR target at the RBS which is determined by the RNC for a mobile station in communication with the RBS. In a first mode, one or more transmit power control commands are generated at the RBS for issuance to the mobile station based on the SIR target received from the RNC. In a second mode, one or more transmit power control commands are generated at the RBS for issuance to the mobile station based on an SIR target determined by the RBS for the mobile station instead of the SIR target received from the RNC. Also in the second mode, artificial mobile station connection quality information is reported from the RBS to the RNC so that the SIR target determined by the RNC is adjusted in accordance with the SIR target determined by the RBS.

24 Claims, 3 Drawing Sheets

(56) References Cited

U.S. PATENT DOCUMENTS

| | | | |
|---|---|---|---|
| 8,135,413 B2* | 3/2012 | Dupray | 455/456.1 |
| 8,169,892 B2* | 5/2012 | Malkamaki et al. | 370/216 |
| 8,208,953 B2* | 6/2012 | Tanaka | 455/522 |
| 8,265,631 B2* | 9/2012 | Usuda et al. | 455/442 |
| 8,300,573 B2* | 10/2012 | Lindskog et al. | 370/318 |
| 8,369,269 B2* | 2/2013 | Nakashima et al. | 370/328 |
| 8,433,355 B2* | 4/2013 | Marinier et al. | 455/522 |
| 8,509,076 B2* | 8/2013 | Reznik et al. | 370/235 |
| 8,515,480 B2* | 8/2013 | Kuroda | 455/522 |
| 2002/0168945 A1* | 11/2002 | Hwang et al. | 455/69 |
| 2003/0003937 A1* | 1/2003 | Ohkubo et al. | 455/517 |
| 2003/0083088 A1 | 5/2003 | Chang et al. | |
| 2004/0142692 A1* | 7/2004 | Schwarz et al. | 455/442 |
| 2004/0266469 A1* | 12/2004 | Hayashi et al. | 455/522 |
| 2005/0099968 A1 | 5/2005 | Yamano | |
| 2005/0143012 A1* | 6/2005 | Gu et al. | 455/67.13 |
| 2005/0227721 A1* | 10/2005 | Nakao | 455/510 |
| 2006/0026490 A1* | 2/2006 | Rinne et al. | 714/774 |
| 2006/0079264 A1* | 4/2006 | Gu et al. | 455/522 |
| 2006/0084475 A1* | 4/2006 | Ohkubo et al. | 455/562.1 |
| 2006/0146889 A1* | 7/2006 | Malkamaki et al. | 370/506 |
| 2006/0165032 A1* | 7/2006 | Hamalainen et al. | 370/328 |
| 2006/0168343 A1* | 7/2006 | Ma et al. | 709/245 |
| 2007/0060189 A1 | 3/2007 | Vallette et al. | |
| 2008/0214227 A1* | 9/2008 | Usuda et al. | 455/522 |
| 2008/0273454 A1* | 11/2008 | Malkamaki et al. | 370/216 |
| 2009/0005104 A1* | 1/2009 | Wang et al. | 455/522 |
| 2009/0150740 A1* | 6/2009 | Iwai et al. | 714/751 |
| 2009/0190485 A1 | 7/2009 | Bjorkegren et al. | |
| 2009/0196270 A1* | 8/2009 | Iwai et al. | 370/342 |
| 2009/0201870 A1* | 8/2009 | Goto et al. | 370/329 |
| 2009/0247211 A1* | 10/2009 | Kuroda | 455/522 |
| 2009/0264128 A1* | 10/2009 | Tomisawa | 455/436 |
| 2009/0305712 A1* | 12/2009 | Franceschini et al. | 455/450 |
| 2010/0097979 A1* | 4/2010 | Shinozaki | 370/315 |
| 2010/0195636 A1* | 8/2010 | Nakashima et al. | 370/342 |
| 2010/0246520 A1* | 9/2010 | Andersson | 370/329 |
| 2011/0041045 A1* | 2/2011 | Iwai et al. | 714/800 |
| 2012/0002610 A1* | 1/2012 | Widegren et al. | 370/328 |

FOREIGN PATENT DOCUMENTS

| | | |
|---|---|---|
| GB | 2389013 A | 11/2003 |
| WO | 01/52425 A2 | 7/2001 |
| WO | 2009/051532 A1 | 4/2009 |

OTHER PUBLICATIONS

3rd Generation Partnership Project, "Review of Proposed Concepts for "Continuous Connectivity for Packet Data Users" WI and Impacts on L2/3", 3GPP TSG RAN2#54, R2-062243, Tallinn, Estonia, Sep. 1-28, 2006.

* cited by examiner

POWER LOOP CONTROL METHOD AND APPARATUS

TECHNICAL FIELD

The present invention generally relates to power loop control, and more particularly relates to implementing power loop control in a radio base station.

BACKGROUND

The uplink performance of WCDMA (Wideband CDMA) relies on the ability of the network to control the transmission power, and consequently, the quality of all connected mobile stations. In WCDMA, a radio network controller (RNC) controls the radio base stations (RBSs) such as NodeBs which service the mobile stations within the network. The RNC carries out radio resource management, including determining a quality target such as SIR (signal to interference ratio) using an OLPC (Outer Loop Power Control) function implemented at the RNC. The SIR target is determined on a relatively slow timescale. The RNC determines an individual SIR target for each mobile station serviced within the network. The task of maintaining a particular SIR target is then left to a more rapidly operating ILPC (Inner Loop Power Control) function performed by each RBS responsible for the corresponding mobile station. For example, an RBS may estimate a received SIR of the dedicated physical control channel allocated to a particular mobile station and compare the SIR estimate to the corresponding SIR target determined by the RNC. The RBS issues transmit power control (TPC) commands to the mobile station, ordering the mobile station to increase or decrease its transmission power depending on whether the SIR estimate is below or above the target SIR. Different mobile stations typically demand different SIR targets depending on the current service, radio conditions, movement, etc.

The target SIR provided by the OLPC function performed at the RNC is occasionally modified based on communication quality. For example, a certain targeted number of re-transmission attempts in a Hybrid ARQ (HARQ) process associated with an enhanced dedicated channel (E-DCH) transport channel can be evaluated by the RNC. If the communication quality is too low, i.e. the number of re-transmission attempts is above the set target, the RNC increases the target SIR. If the communication quality is too high, i.e. the number of re-transmission attempts is below the set target, the RNC decreases the target SIR. The SIR target can be similarly modified based on block error rate information. In either case, changes in an SIR target for a particular mobile station are communicated from the RNC to each RBS serving the affected mobile station. As such, the RNC implements the OLPC function and the RBSs implement the ILPC function.

In WCDMA, soft handover can occur from time-to-time meaning that the transmission power of a mobile station is controlled by two RBSs simultaneously. Soft handover is typically implemented in one of two different ways. With partial soft handover, two or more RBSs control the mobile station power to meet the SIR target specified by the RNC. However, data is only received by the RBS responsible for the serving cell. With full soft handover, two or more RBSs control the mobile station power to meet the SIR target specified by the RNC, and the data is received by at least two RBSs out of the two or more RBSs controlling the mobile station power. When no soft handover is performed, the active set of the mobile station contains only the serving cell which has the sole responsibility for transmit power control and data reception. In each of these scenarios, the design choice in WCDMA is typically to maintain the same SIR target in all controlling RBSs by having the OLPC function placed in the RNC, not the RBSs.

With the OLPC function placed in the RNC, there is limited information available to the RNC for determining the SIR target as compared to the additional information available at the RBSs. Consequently, conventional OLPC algorithms typically monitor the block error rate of the payload. Furthermore, placement of the OLPC function in the RNC introduces delay in the algorithm. The delay can be divided into two parts: the delay of the actual signaling between the RNC and the RBSs, which is not negligible; and the additional delay introduced by using the block error of the payload. In the case of HSUPA (High-Speed Uplink Packet Access), the RNC is not aware of any failed transmissions until the transmission is correctly received and relayed up to the RNC. As such, placing the OLPC function in the RNC introduces delay and restricts the information available for determining a suitable mobile station SIR target.

SUMMARY

Outer loop power control is implemented in either the RNC or an RBS depending on the operating mode of the RBS. In a first mode, outer loop power control for a particular mobile station is implemented at the RNC and adhered to by the serving RBS when the mobile station. In a second mode, the outer loop power control function can be implemented at the RBS responsible for the serving cell. Implementing outer loop power control in this way enhances power loop control performance, e.g. when the mobile station is in partial soft handover or no soft handover, but not full soft handover. When an RBS implements outer loop power control, it does so without the RNC being aware that the RBS has taken over control of the outer loop power control function. The RBS ignores the SIR target provided by the RNC, and determines its own SIR target when the mobile station is in partial soft handover or no soft handover. The RBS also reports artificial mobile station connection quality information such as an artificial number of retransmission attempts or an artificial block error rate to the RNC to influence how the original SIR target is adjusted by the RNC. This way, when the mobile station enters full soft handover, the RNC communicates the same target SIR value to each RBS performing the soft handover. This in effect allows an RBS to set the SIR target at the RNC.

According to an embodiment of a method for implementing power loop control at a RBS controlled by an RNC, the method includes receiving an SIR target at the RBS which is determined by the RNC for a mobile station in communication with the RBS. In a first mode, one or more transmit power control commands are generated at the RBS for issuance to the mobile station based on the SIR target received from the RNC. In a second mode, one or more transmit power control commands are generated at the RBS for issuance to the mobile station based on an SIR target determined by the RBS for the mobile station instead of the SIR target received from the RNC. Also in the second mode, artificial mobile station connection quality information is reported from the RBS to the RNC so that the SIR target determined by the RNC is adjusted in accordance with the SIR target determined by the RBS.

Of course, the present invention is not limited to the above features and advantages. Those skilled in the art will recog-

DETAILED DESCRIPTION

Figure 1:
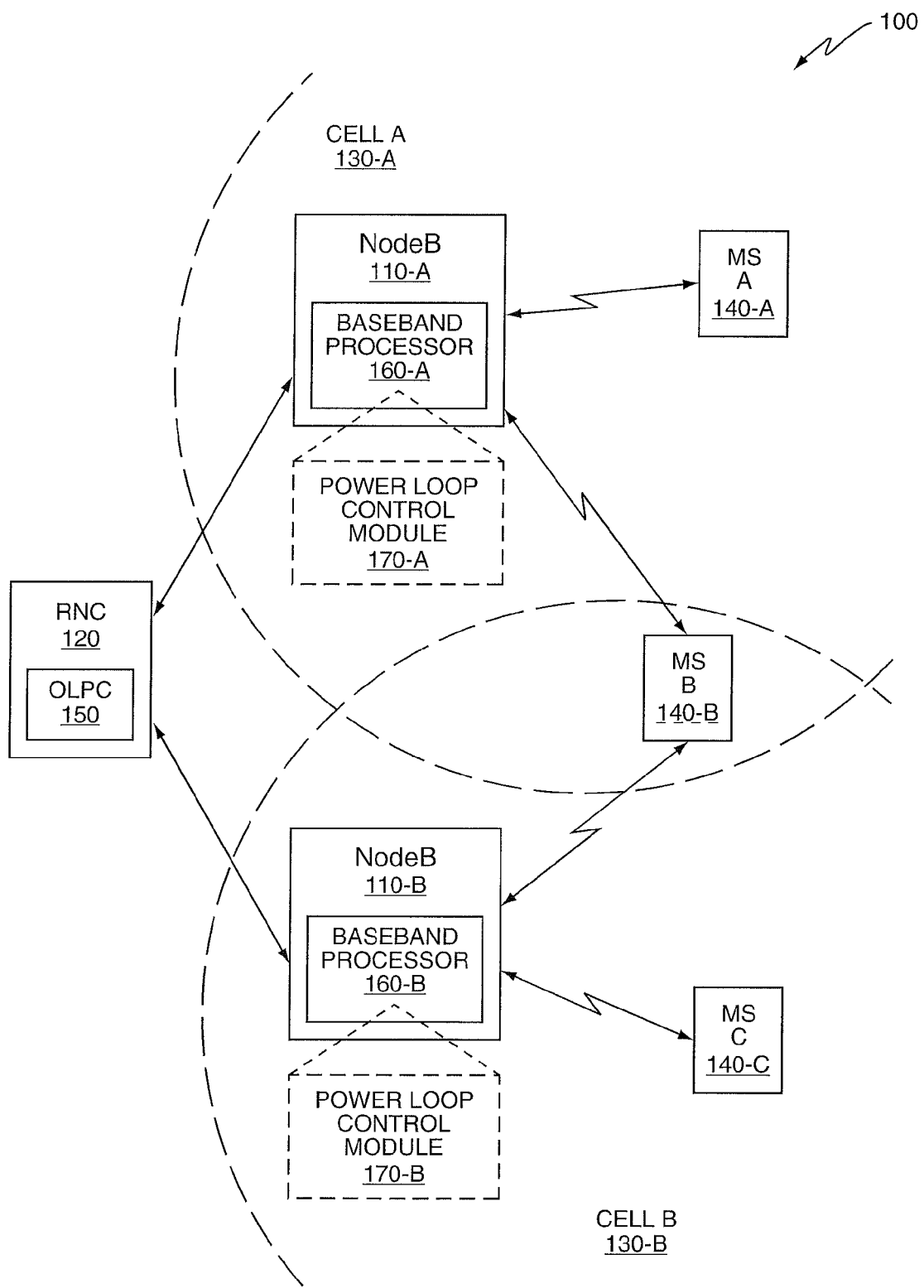
FIG. 1 illustrates a block diagram of a WCDMA network including an RNC and a plurality of RBSs which implement outer loop power control.

FIG. 1 illustrates an embodiment of a WCDMA network 100, including a plurality of RBSs 110 (e.g. NodeBs) controlled by a RNC 120. Each RBS 110 services one or more particular cells 130 within the network 100. Mobile stations 140 located within the network 100 are serviced by one or more of the RBSs 110 depending on whether the mobile stations 140 are in soft handover or not. For example, a mobile station 140 may be in partial soft handover, meaning that two or more of the RBSs 110 control the mobile station power to meet an individual SIR target specified for the mobile station 140. Data is only received by the RBS 110 responsible for the serving cell 130 in partial soft handover. Another mobile station 140 may be in full soft handover, meaning that two or more of the RBSs 110 control the mobile station power to meet the specified SIR target, and the data is received by at least two RBSs 110 out of the two or more RBSs controlling the mobile station power. Yet other mobile stations 140 may not be in soft handover, and thus the active set of each of these mobile stations 140 contains only the serving cell 130 which has the sole responsibility for transmit power control and data reception.

Outer loop power control (OLPC) is implemented at either the RNC 120 or an RBS 110 depending on whether the corresponding mobile station 140 is in partial soft handover, full soft handover or no soft handover. The RNC 150 implements an OLPC function 150 for a particular mobile station 140 when the mobile station 140 is in full soft handover. Otherwise, the OLPC function can be implemented at the RBS 110 responsible for the serving cell 130. Each RBS 110 includes a baseband processor 160 and a power loop control module 170 included in or associated with the baseband processor 160 for implementing the OLPC function when advantageous to do so. For example, if a particular mobile station 140 is in partial soft handover or no soft handover, only a single RBS 110 gives input to the OLPC function 150 performed at the RNC 120. Consequently, the input to the RNC 120 comes from only one RBS 110. As such, there is no need to wait for the deterministic response of the RNC 120 when setting the individual SIR target for the mobile station 140. This characteristic can be exploited even further. Since the input to the RNC 120 comes from only one RBS 110 during partial soft handover or no soft handover, the RBS 110 can itself determine the SIR target and what information to send to the RNC 120 to ensure SIR target consistency across all of the RBSs 110, effectively moving the OLPC function from the RNC 120 to the RBS 110.

With RNC-based OLPC, all RBSs 110 that control the transmission power of a particular mobile station 140 should have the same SIR target as input to the TPC generating function implemented by the RBS power loop control module 170. This principle can be compromised when the mobile station 140 is in partial soft handover or no soft handover, because only a single RBS 110 is responsible for the corresponding serving the cell 130. The power loop control module 170 at the RBS 110 is designed in such a way that differences between the SIR target determined by the RNC 120 and the SIR target determined at the RBS 110 is only temporary, and thus any potentially harmful effects are mitigated. In an embodiment, the RBS 110 reports artificial mobile station connection quality information to the RNC 120, influencing how the SIR target is determined at the RNC 120. Accordingly, the SIR target determined at the RNC 120 is adjusted in accordance with the SIR target determined at the RBS 110. The RNC 120 reports the modified SIR target to the other RBSs 110, so that each RBS 110 which may eventually assist in full soft handover implements ILPC based on the same SIR target.

The aim of the RNC OLPC function is to control the block error probability and the number of re-transmission attempts, e.g. of the E-DCH. To achieve these ends, the RNC OLPC 150 increases the corresponding SIR target if the number of re-transmission attempts exceeds a threshold and reduces the SIR target if the number of re-transmission attempts is less than or equal to the threshold. The SIR target may be similarly adjusted by the RNC OLPC 150 based on block error probability information instead of the re-transmission information. In either case, the RNC 120 behaves deterministically in response to feedback information from the RBSs 110 when setting the SIR target. The power loop control module 170 of the RBSs 110 utilize this deterministic behavior of the RNC 120 when reporting artificial mobile station connection quality information back to the RNC 120 for the purpose on influencing how the SIR target is determined at the RNC 120. Accordingly, each RBS 110 can control the SIR target at the RNC 120 to a pre-determined level, thus maintaining SIR target consistency within the network 100 even though OLPC is implemented at the RBSs 110 under certain conditions.

Figure 2:
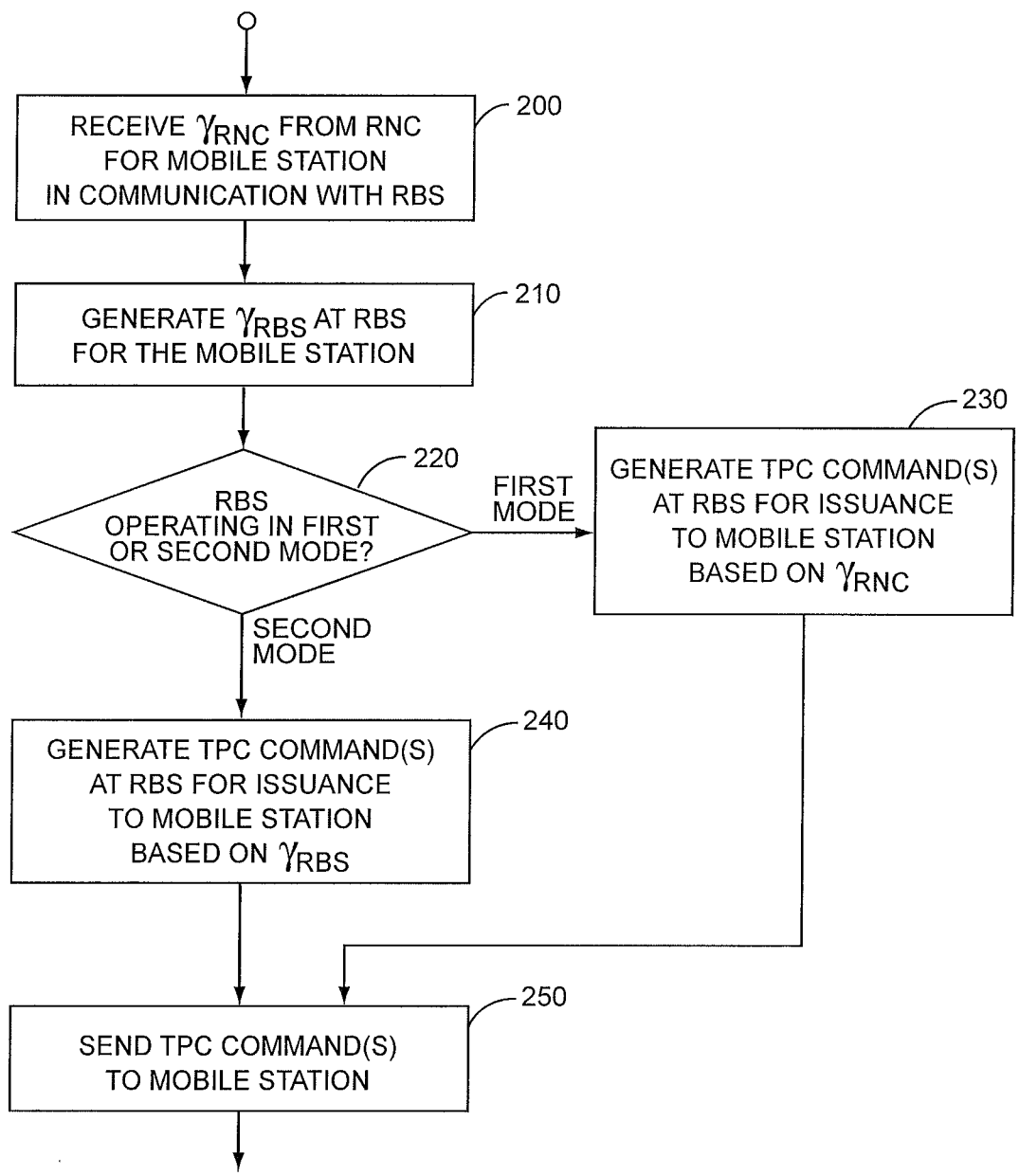
FIG. 2 illustrates a flow diagram of an embodiment of a method for implementing outer loop power control at an RBS.

FIG. 2 illustrates a flow diagram of an embodiment of implementing power loop control at an RBS 110 controlled by the RNC 120. An SIR target ($\gamma_{RNC}$) is received at the RBS 110, the SIR target being determined at the RNC 120 for a mobile station 140 in communication with the RBS 110 (Step 200). At the initiation of a session, $\gamma_{RNC}$ is set to a certain value. The OLPC function implemented at the RNC 120 or RBS 110 then increases or decreases the value of $\gamma_{RNC}$ depending on the number of transmission attempts that were reported, e.g. at any given time $\gamma_{RNC}$ can be the initiation value plus all changes that have been performed during the session. The RBS power loop control module 170 determines a new SIR target ($\gamma_{RBS}$) at the RBS 110 for the mobile station 140 (Step 210). The RBS 110 can determine $\gamma_{RBS}$ based on a multitude of measurements available at the RBS 110. In one embodiment, $\gamma_{RBS}$ depends on the number of iterations a turbo decoder included in the RBS 110 needs to successfully decode the last transmission. In another embodiment, the RBS 110 can determine $\gamma_{RBS}$ in the same way as $\gamma_{RNC}$ is determined at the RNC 120.

In each case, the power loop control module 170 also determines whether the RBS 110 is operating in a first mode or a second mode (Step 220). The RBS 110 operates in the first mode when the mobile station 140 is in full soft handover. In one embodiment, the RBS 110 operates in the first mode responsive to the mobile station 140 or the RNC 120 signaling full soft handover to the RBS 110. For example, a non-serving RBS 110 may communicate full soft handover status via the RNC 120 or the mobile station 140. In another embodiment, the RBS 110 operates in the first mode responsive to receiving an SIR target from the RNC 120 which falls outside an expected range. For example, the RNC 120 may signal a reduction of $\gamma_{RNC}$ even though the RBS 110 has sent artificial mobile station connection quality information to the RNC 120 which should have caused the RNC 120 to increase $\gamma_{RNC}$. In yet another embodiment, the RBS 110 operates in the first mode responsive to the mobile station 140 failing to retransmit data when instructed to do so by the RBS 110.

In each case, the power loop control module 170 of the RBS 110 generates one or more TPC commands for issuance to the mobile station 140 when the RBS 110 is in the first mode based on the SIR target received from the RNC 120 (Step 230). This way, each RBS 110 implementing full soft handover uses the same SIR target determined by the RNC OLPC 150 for transmit power control.

In the second mode, the power loop control module 170 generates one or more TPC commands for issuance to the mobile station 140 based on the SIR target ($\gamma_{RBS}$) determined at the RBS 110 instead of the SIR target ($\gamma_{RNC}$) received from the RNC 120 (Step 240). The RBS 110 operates in the second mode when the mobile station 140 is in partial soft handover or no soft handover. In one embodiment, the RBS 110 operates in the second mode responsive to the mobile station 140 or the RNC 120 signaling partial soft handover or no soft handover to the RBS 110. For example, a message received from the RNC 120 may include the number of links in the active set. If the number is one, the RBS 110 can take control of the OLPC function. In another embodiment, the RBS 110 operates in the second mode responsive to a retransmission process supported by the RBS 110 indicating the RBS 110 is the only RBS controlled by the RNC 120 which is receiving data from the mobile station 140. For example, the estimated probability for the mobile station 140 to ignore requests for retransmissions may be below a certain limit, indicating no full soft handover. If such requests were ignored, the mobile station 140 could be in full soft handover. In another example, the number of times requests for retransmissions appears to have been ignored by the mobile station 140 during a particular time period/window may be less than a threshold value, again indicating no full soft handover.

In each case, the RBS 110 can use a different and more timely SIR target than the SIR target received from the RNC 120 for transmit power control when the RBS 110 is operating in the second mode, i.e. the RBS 110 is the only RBS responsible for the serving cell 130 of the mobile station 140. In effect, the RBS 110 overrides the RNC OLPC 150 by using its own SIR target for implementing ILPC when in the second mode. The RNC 120 is unaware that the RBS has determined its own SIR target for use in ILPC, and thus continues operating as if the RNC 120 were controlling the OLPC function. The TPC command(s) generated by the RBS power loop control module 170 in either the first or second mode are then sent to the mobile station 140 for adjusting mobile station transmit power (Step 250).

The power loop control module 170 also generates artificial mobile station connection quality information for reporting from the RBS 110 to the RNC 120 in the second mode so that the SIR target ($\gamma_{RNC}$) determined by the RNC 120 can be adjusted in accordance with the SIR target ($\gamma_{RBS}$) determined by the RBS 110. The artificial mobile station connection quality information can be sent in an RLC (Radio Link Control) protocol header to the RNC 120. The connection quality information reported by the RBS 110 in the second mode is artificial in that the information does not necessarily reflect the actual connection quality experienced by the corresponding mobile station 140. Instead, the artificial connection quality information replaces the actual information and is determined based on the deterministic behavior of the RNC 120 in setting the SIR target ($\gamma_{RNC}$) responsive to such information. In effect, this enables the RBS 110 to control how the SIR target at the RNC 120 is adjusted so that $\gamma_{RNC}=\gamma_{RBS}$. This ensures that all RBSs 110 which subsequently implement full soft handover for the affected mobile station 140 use the same SIR target for generating TPC commands instead of different SIR targets.

Figure 3:
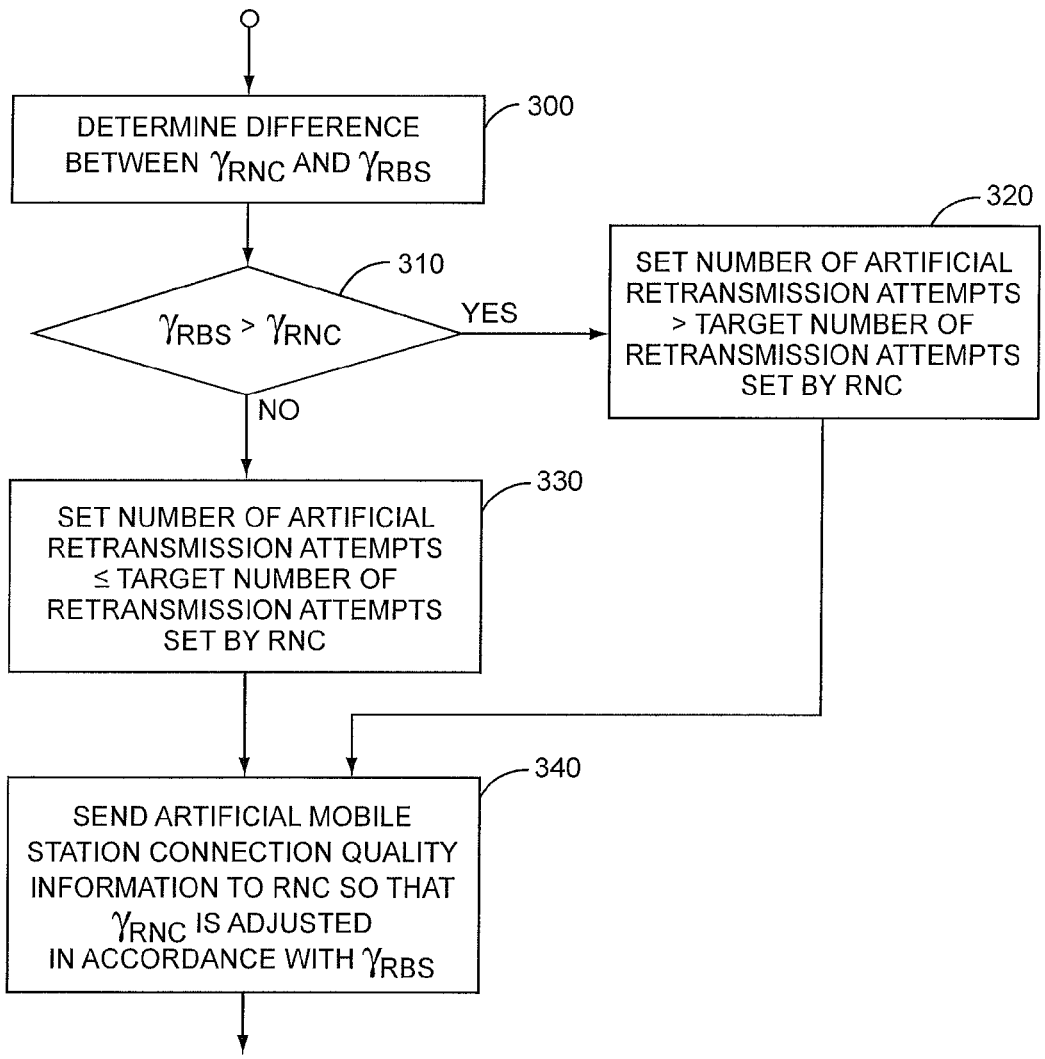
FIG. 3 illustrates a flow diagram of an embodiment of a method for generating artificial mobile station connection quality information at an RBS for influencing the SIR target determined at the RNC.

FIG. 3 illustrates a flow diagram of an embodiment for generating the artificial mobile station connection quality information by the RBS power loop control module 170 for influencing how the SIR target ($\gamma_{RNC}$) is adjusted at the RNC 120. The power loop control module 170 determines the difference between the SIR target ($\gamma_{RNC}$) determined at the RNC 120 and the SIR target ($\gamma_{RBS}$) determined at the RBS 110 (Step 300). The power loop control module 170 then determines an artificial number of retransmission attempts based on this difference irrespective of a number of actual retransmission attempts made by the corresponding mobile station 140. If $\gamma_{RBS}>\gamma_{RNC}$ (Step 310), the power loop control module 170 sets the artificial number of retransmission attempts greater a target number of retransmission attempts determined by the RNC 120 for the mobile station 140 (Step 320). Otherwise (Step 310), the artificial number of retransmission attempts is set less than or equal to the target number of retransmission attempts (Step 330). In another embodiment, the power loop control module 170 sets the artificial number of retransmission attempts greater or equal to the target number of retransmission attempts mobile station 140 if $\gamma_{RBS}>\gamma_{RNC}$ and less than the target number of retransmission attempts if $\gamma_{RBS}\leq\gamma_{RNC}$. In either case, the RBS 110 then sends the artificial mobile station connection quality information to the RNC 120 for processing (Step 340).

The RNC 120 deterministically adjusts $\gamma_{RNC}$ in response to the artificial mobile station connection quality information communicated by the RBS 110. For example, if the artificial number of retransmission attempts determined by the power loop control module 170 exceeds the target number of retransmission attempts set by the RNC 120, the RNC OLPC 150 increases $\gamma_{RNC}$. The RNC OLPC 150 decreases $\gamma_{RNC}$ if the artificial number of retransmission attempts is below the target number of retransmission attempts set by the RNC 120. Otherwise, $\gamma_{RNC}$ is not adjusted. In this way, the RBS 110 can force the RNC 120 to set $\gamma_{RNC}=\gamma_{RBS}$. In an alternate embodiment, the artificial mobile station connection quality information determined at the RBS 110 is an artificial block error rate determined by the power loop control module 170 irrespective of an actual block error rate associated with the corresponding mobile station 140. The RNC 120 adjusts $\gamma_{RNC}$ in response to the artificial block error rate according to this embodiment, e.g. by increasing or decreasing $\gamma_{RNC}$ depending on whether the artificial block error rate exceeds a particular threshold. In either case, all RBSs 110 which subsequently implement full soft handover for the affected mobile station 140 implement ILPC using the same SIR target determined by the RNC OLPC 150. In each case, the RNC 120 does not respond to a request for an increase in $\gamma_{RNC}$ by decreasing $\gamma_{RNC}$. A request to increase $\gamma_{RNC}$ can be met with a decision not to change $\gamma_{RNC}$, e.g. if $\gamma_{RNC}$ is already at a maximum level or if another algorithm is active. The same response behavior applies for requests to decrease $\gamma_{RNC}$.

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. A method of implementing power loop control at a radio base station controlled by a radio network controller, comprising:
   receiving an SIR target at the radio base station which is determined by the radio network controller for a mobile station in communication with the radio base station;
   in a first mode, generating one or more transmit power control commands at the radio base station for issuance to the mobile station based on the SIR target received from the radio network controller; and
   in a second mode, generating one or more transmit power control commands at the radio base station for issuance to the mobile station based on an SIR target determined by the radio base station for the mobile station instead of the SIR target received from the radio network controller and reporting artificial mobile station connection quality information from the radio base station to the radio network controller so that the SIR target determined by the radio network controller is adjusted in accordance with the SIR target determined by the radio base station.

2. The method of claim 1, comprising determining the artificial mobile station connection quality information by the radio base station irrespective of actual mobile station connection quality.

3. The method of claim 2, wherein the artificial mobile station connection quality information is an artificial number of retransmission attempts determined by the radio base station irrespective of a number of actual retransmission attempts made by the mobile station.

4. The method of claim 3, comprising:
   setting the artificial number of retransmission attempts greater than a target number of retransmission attempts determined by the radio network controller for the mobile station if the SIR target determined by the radio base station is greater than the SIR target received from the radio network controller; and
   otherwise setting the artificial number of retransmission attempts less than or equal to the target number of retransmission attempts.

5. The method of claim 2, wherein the artificial mobile station connection quality information is an artificial block error rate determined by the radio base station irrespective of an actual block error rate associated with the mobile station.

6. The method of claim 1, wherein the first mode corresponds to the mobile station being in full soft handover.

7. The method of claim 6, comprising operating in the first mode responsive to the mobile station or the radio network controller signaling full soft handover to the radio base station.

8. The method of claim 6, comprising operating in the first mode responsive to the radio base station receiving an SIR target from the radio network controller which falls outside an expected range.

9. The method of claim 6, comprising operating in the first mode responsive to the mobile station failing to retransmit data when instructed to do so by the radio base station.

10. The method of claim 1, wherein the second mode corresponds to the mobile station being in partial soft handover or no soft handover.

11. The method of claim 10, comprising operating in the second mode responsive to the mobile station or the radio network controller signaling partial soft handover or no soft handover to the radio base station.

12. The method of claim 10, comprising operating in the second mode responsive to a retransmission process supported by the radio base station indicating the radio base station is the only radio base station controlled by the radio network controller that is receiving data from the mobile station.

13. A radio base station, comprising a baseband processor configured to:
   process an SIR target received from a radio network controller that controls the radio base station, the SIR target determined by the radio network controller for a mobile station in communication with the radio base station;
   in a first mode, generate one or more transmit power control commands for issuance to the mobile station based on the SIR target received from the radio network controller; and
   in a second mode, generate one or more transmit power control commands for issuance to the mobile station based on an SIR target determined at the radio base station for the mobile station instead of the SIR target received from the radio network controller and report artificial mobile station connection quality information to the radio network controller so that the SIR target determined by the radio network controller is adjusted in accordance with the SIR target determined at the radio base station.

14. The radio base station of claim 13, the baseband processor is configured to determine the artificial mobile station connection quality information irrespective of actual mobile station connection quality.

15. The radio base station of claim 14, wherein the artificial mobile station connection quality information is an artificial number of retransmission attempts determined by the baseband processor station irrespective of a number of actual retransmission attempts made by the mobile station.

16. The radio base station of claim 15, wherein the baseband processor is configured to set the artificial number of retransmission attempts greater than a target number of retransmission attempts determined by the radio network controller for the mobile station if the SIR target determined by the radio base station is greater than the SIR target received from the radio network controller, and otherwise set the artificial number of retransmission attempts less than or equal to the target number of retransmission attempts.

17. The radio base station of claim 14, wherein the artificial mobile station connection quality information is an artificial block error rate determined by the baseband processor irrespective of an actual block error rate associated with the mobile station.

18. The radio base station of claim 13, wherein the first mode corresponds to the mobile station being in full soft handover.

19. The radio base station of claim 18, wherein the baseband processor is configured to operate in the first mode responsive to the mobile station or the radio network controller signaling full soft handover to the radio base station.

20. The radio base station of claim 18, wherein the baseband processor is configured to operate in the first mode responsive to an SIR target received from the radio network controller falling outside an expected range.

21. The radio base station of claim 18, wherein the baseband processor is configured to operate in the first mode responsive to the mobile station failing to retransmit when instructed to do so by the radio base station.

22. The radio base station of claim 13, wherein the second mode corresponds to the mobile station being in partial soft handover or no soft handover.

23. The radio base station of claim 22, wherein the baseband processor is configured to operate in the second mode responsive to the mobile station or the radio network controller signaling partial soft handover or no soft handover to the radio base station.

24. The radio base station of claim 22, wherein the baseband processor is configured to operate in the second mode responsive to a retransmission process supported by the baseband processor indicating the radio base station is the only radio base station controlled by the radio network controller that is receiving data from the mobile station.

* * * * *